United States Patent
Davis et al.

[11] 3,878,658
[45] Apr. 22, 1975

[54] FOAM BOARD INSULATION SYSTEM

[75] Inventors: Robert Newton Davis, Bolingbrook; Royce Jay Laverman, South Holland; Ivan Vallier LaFave, Naperville, all of Ill.

[73] Assignee: Chicago Bridge & Iron Company, Oak Brook, Ill.

[22] Filed: Aug. 29, 1973

[21] Appl. No.: 392,637

[52] U.S. Cl................ 52/410; 220/15; 220/9 LG; 114/74 A
[51] Int. Cl........................... E04b 2/02; E04b 5/57
[58] Field of Search ............... 52/404–413, 52/248, 249, 479, 480, 613, 506–508; 220/15, 9 LG; 114/74 A

[56] References Cited
UNITED STATES PATENTS

| | | | |
|---|---|---|---|
| 1,820,304 | 8/1931 | Ellis | 220/15 |
| 1,934,651 | 11/1933 | Anderson | 52/410 |
| 2,009,619 | 7/1935 | Huffine | 161/102 |
| 2,164,322 | 7/1939 | Hahn | 52/408 |
| 2,326,717 | 8/1943 | Zeidler | 52/407 |
| 2,382,474 | 8/1945 | Gambo | 52/410 |
| 2,928,565 | 3/1960 | Glasoe | 220/15 |
| 3,093,260 | 6/1963 | Macormack et al. | 220/15 |
| 3,378,975 | 4/1968 | Hill | 52/508 |
| 3,523,395 | 8/1970 | Rutter et al. | 52/410 |
| 3,773,604 | 11/1973 | Desai et al. | 52/309 |
| 3,782,049 | 1/1974 | Sachs | 52/309 |

*Primary Examiner*—Frank L. Abbott
*Assistant Examiner*—James L. Ridgill, Jr.
*Attorney, Agent, or Firm*—Merriam, Marshall, Shapiro & Klose

[57] ABSTRACT

A rigid surface is insulated by a plurality of studs projecting perpendicularly therefrom; a first layer of insulation boards placed against the surface; a plurality of wooden strakes positioned over the abutting insulation boards of the first layer and secured to the studs; a second layer of insulation boards attached to the first layer; and a third layer of insulation boards held in contact with the second layer by means of fasteners secured to the wooden strakes in the first layer.

10 Claims, 3 Drawing Figures

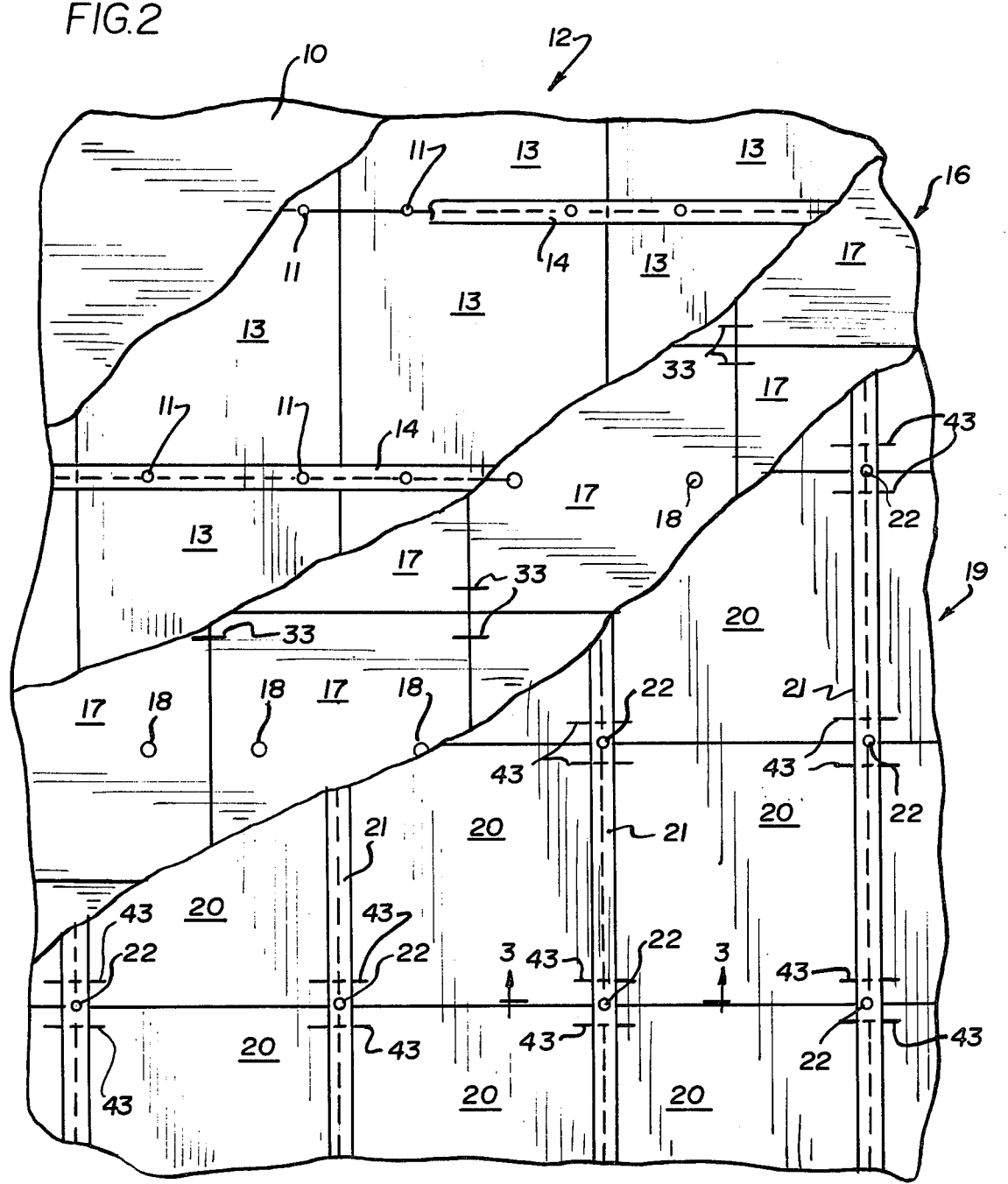

FOAM BOARD INSULATION SYSTEM

This invention relates to the insulation of surfaces to retard heat flow to keep stored materials at a temperature above or below ambient temperature. More particularly, this invention is concerned with an insulation system for surfaces subjected to low temperatures such as in the storage or transport of liquefied gases.

Many materials are treated, stored or used at temperatures much higher or lower than ambient temperature. To keep the materials at such temperature the vessels or tanks used to store or transport the materials are generally insulated to retard heat flow to the material when it is below ambient temperature, and heat flow from the material when it is above ambient temperature. To retard heat flow it is conventional to insulate the exterior of the vessel or tank containing the material, or to insulate the interior surface of a chamber or container in which the storage or transport vessel or tank is placed. While various insulation systems are disclosed in the prior art there is a need for a comparatively low cost insulation system which is highly efficient in retarding heat leak and which can be readily installed with widely available equipment.

According to the present invention, a surface, such as on a vessel, tank, wall, floor or ceiling, through which it is desired to retard heat flow, is insulated by a composite structure comprising a plurality of studs projecting perpendicularly from the rigid surface, a first layer of insulation boards in side-by-side abutment positioned against the rigid surface, a plurality of wooden strakes placed over the abutting insulation boards of the first layer and secured to the studs, a second layer of insulation boards placed in side-by-side abuttment and held in contact with the first layer by means of an adhesive or fasteners secured to the wooden strakes, and a third layer of insulation boards held in contact with the second layer by means of fasteners secured to the wooden strakes on the first layer. Although not essential, it is advisable to place wooden strakes on the third layer and extend fasteners from those strakes through the insulation to the strakes on the first layer to secure the insulation boards of the second and third layers together and to the first layer. For this reason, the adhesive or fasteners used to hold the second layer on the first layer need only have a temporary holding or attaching capacity.

The insulation placed on the surface is advisably jacketed with a vapor barrier to retard heat leak by convection of gases in and out of the insulation and to provide protection against the influx of moisture and other vapors, both in service and prior to installation of the structure.

The studs are advisably bolts or the equivalent located at the joints of insulation boards in the first layer. The studs can be positioned in equally spaced-apart rows or in rows which are unequal, such as when a sphere is covered. The strakes furthermore are generally positioned to span the joints of abutting first layer insulation boards and are desirably held in place by means of nuts threaded onto stud bolts. The strakes are conveniently put in grooves in the first insulation layer to provide an overall smooth surface for the first layer of insulation.

The insulation boards are advisably shaped and dimensioned to conveniently cover the surface being insulated. The insulation boards in a layer generally will have the same thickness, although they need not be the same thickness in all instances. Furthermore, each insulation layer can be the same thickness as the other layers or one or more layers may have a different thickness than the other layers.

The insulation boards can be fabricated from foamed plastic polymeric materials such as polyurethane, foamed glass, glass fibers, compacted plant fibers, wooden boards such as balsa wood or other materials which provide good thermal insulation at low temperatures. Also, all layers need not be made of the same material or composition. One or more layers can differ in composition from the other layers, or each layer may have a different composition. Thus, it may be advantageous to use materials of high density or low coefficient of expansion on the cold side.

To aid in retarding heat leak, the insulation boards of the second layer are positioned so that the joints formed by placing the insulation boards in side-by-side, and end-to-end, position are substantially staggered with respect to the joints in the first layer. For the same reason, the insulation boards of the third layer are positioned to have joints substantially parallel and in-line with the joints in the first layer. The end joints of the insulation boards are preferably staggered between adjacent layers to the end that no joints of one layer are placed in line with joints in another layer. This prevents a direct gas convection flow path from developing through two or more layers with temperature or mechanically induced dimensional change of the insulation boards. Such distortions are accommodated by the system without cracking or other deterioration.

Any suitable type of fasteners, including adhesives, can be used to secure the second and third layers of insulation board to the wooden strakes on the first layer. However, nails or screws or their equivalent are considered particularly useful for this purpose. Attachment of the second layer is only temporary until the third layer can be secured over it.

The invention will be described further in conjunction with the attached drawings, in which:

FIG. 2 is an elevational view, partially broken away, of the insulated surface of FIG. 1.

So far as is practical, the same or similar parts or elements which appear in the different views of the drawings will be identified by the same numbers.

Figure 1:
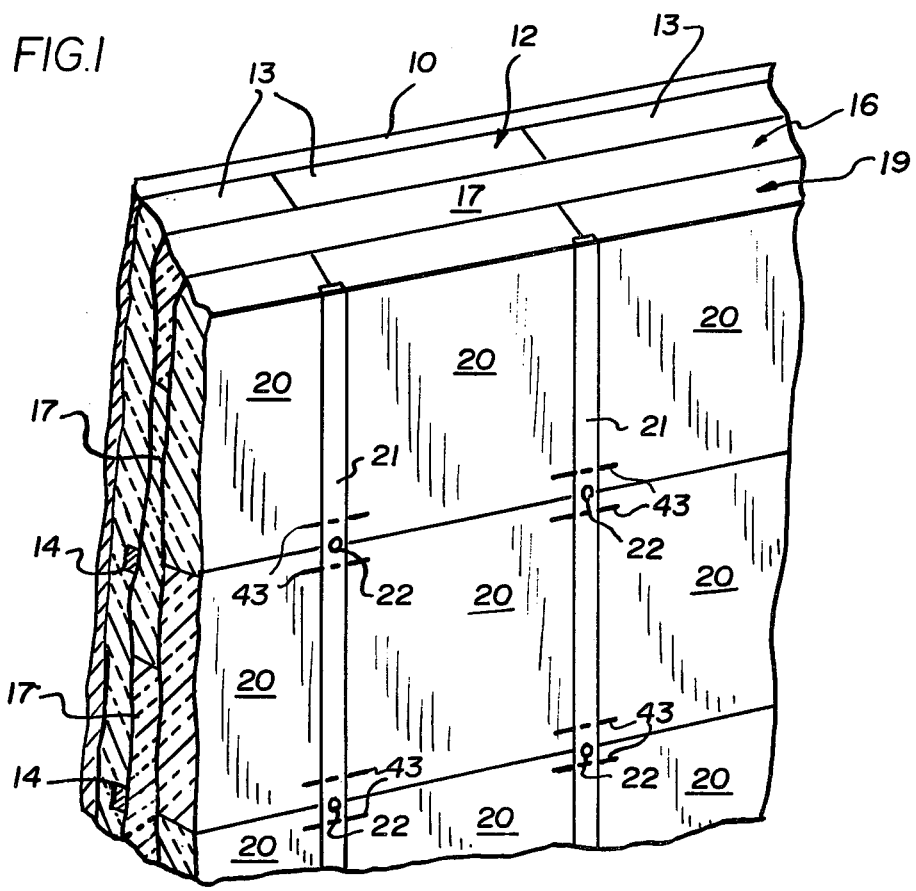
FIG. 1 is a partial isometric view of an insulated surface according to the invention.

With reference to the drawings the rigid surface 10, which can be metal, has rows of spaced apart threaded studs 11 attached to surface 10. Metal studs can be welded to surface 10 and nonmetallic studs can be attached by a suitable adhesive to surface 10. A first layer 12 of insulation boards 13 is in contact with the surface 10. The insulation boards 13 are placed tightly between the rows of studs 11 so that the sides and ends of the boards are in abutting contact with adjacent insulation boards. The center-to-center spacing of the rows of studs in equal to the width of the precut insulation boards. Each board is placed between adjacent rows or columns of studs and abraded onto the threads to provide a secure fit. Alternatively, a recess cut can be provided at the board edges to fit around the studs or precut holes can be made in the insulation boards at their joints to receive the studs.

The longitudinal edges or sides of the insulation boards 13 adjacent the stud rows are rabetted prior to placement to provide a groove or trough in which wooden strake 14 can be fitted to permit the strake to be positioned flush with the top surface of the insulation boards. The strakes 14 are predrilled to fit over the studs and are countersunk to receive washers and retaining nuts 15 threaded over the studs. Alternatively, a Tee nut may be threaded over the stud ends. The ends of the insulation boards, i.e., those without wooden strakes spanning the joints, can be joined with butt, step or splined joints, all of which are broadly referred to herein as abutting joints.

A second layer 16 of insulation boards 17 is placed over the first layer 12 in such manner that the longitudinal and end joints are staggered with respect to the first layer joints. The joints are staggered between the first and second layers 12 and 16 to minimize the effects of joint gapping due to thermal shrinkage. Thus, the insulation boards of the second layer can have joints substantially parallel to, but offset from, joints in the first layer. Nails 18, such as ring shank nails with a wide flat head, are driven through insulation boards 17 and into wooden strakes 14 to hold the boards in place. These need provide only temporary support during construction. Screws can, of course, be used instead of nails.

The third layer 19 is composed of insulation boards 20 placed in contact with the second layer 16. The joints in the third layer are offset or staggered with respect to the joints in the second layer. Advisably, the insulation boards of the third layer have the joints positioned to be substantially parallel to, and in-line with, the joints in the first layer. The opposing edges of insulation boards 20 are cut out or rabbeted so that when the edges of two adjacent boards are joined together wooden strakes 21 can be positioned in the resulting groove or trough. The resulting surface need not be flush, i.e., the depth of the trough need not equal the thickness of the strake. The wooden strakes 21 are advisably placed lateral to the direction in which the strakes 14 run to better secure the layers together. Nails or lag screws 22 of a material suitable for low environmental temperatures e.g., stainless steel and aluminum, are placed in predrilled holes in strakes 21 and driven through the insulation boards of the third and second layers 19 and 16 into the lower strakes 14 at intersection points, i.e. where one wooden strake crosses the other, to secure the layers together. The heads 23 of the nails or screws are set in countersunk holes in strakes 21 to provide a smooth outer surface.

Although the insulation boards of the three layers are shown with joints which are parallel or at right angles to one another it is within the scope of the invention to place the insulation boards so that the joints of each layer are at an angle other than 90° to the joints in the lower or upper layer. Furthermore, the top strakes 21 can be positioned at a right angle, or at some angle other than 90°, to strakes 14.

Figure 3:
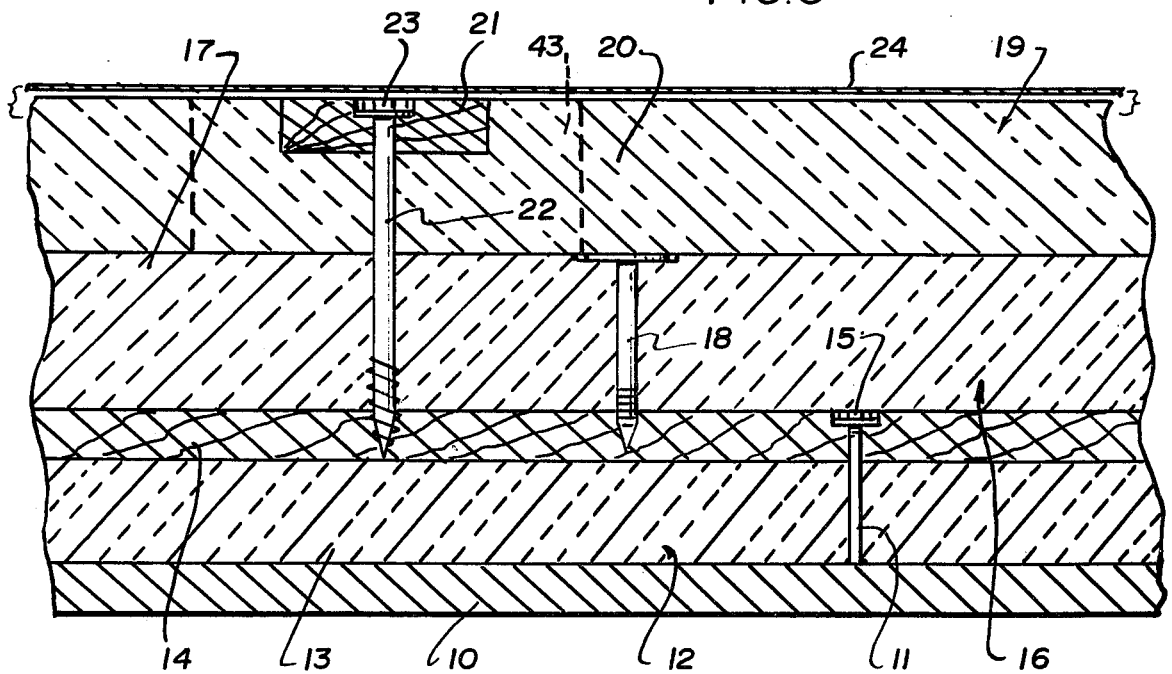
FIG. 3 is a sectional view taken along the line 3—3 of FIG. 2.

To minimize overall heat transfer through the insulation, it is advisable to prevent convective mass transfer of gases in and out of the insulation. To do this, the outside surface of the insulation should be sealed with a vapor barrier. The sealing means must be flexible enough to withstand thermal deflections and mechanical distortions in use. There are several methods which can be used for the seal. One is to apply a vapor barrier mastic coating over the insulation. Another method is to jacket the insulation with metal or plastic sheeting. If metal or plastic sheeting is used, the joints in at least one layer of the insulation, preferably on the warm side, should be sealed with a non-rigid caulking material. FIG. 3 shows metal sheeting 24 placed over the surface of the third layer 19 to prevent convective mass transfer of gases in and out of the insulation. For ship tanks, the metal provides the spray shield required by the U.S. Coast Guard. Furthermore, convection stop barriers made of sheet plastic can be inserted in the insulation boards laterally across a joint to the full thickness of the boards in some or all vertical insulation board joints to provide a barrier to flow of vapor downwardly or upwardly. These convection stop barriers may be placed in all of the layers, but are advisably placed in at least the center and cold side layers. FIGS. 1 and 2 show convection stop barriers placed in the center and top layers, and illustrates the case where the coldest layer is on top. Convection stops 33 are placed in the joints in the middle insulation layer and convection stops 43 are placed in the joints in the top insulation layer.

The described insulation system is extremely flexible in its adaptability to various insulating applications. It can be applied to flat, single-curved and double-curved surfaces. The insulation board shape can be varied to accommodate the effects of curvature. Thermal movement of the insulation is readily accommodated through the staggered joints and the location of the fasteners in the joints.

The wooden strakes not only serve to reduce the heat leak by staggering fastener penetrations but they also provide the insulation system with a high structural integrity. The outer wooden strakes also provide a suitable means for attachment of a spray shield, which is required around a tank on a ship, for protection of the ship cargo hold plating from leakage of a liquefied gas such as liquefied natural gas transported in the tank.

The insulation system of this invention is particularly useful on marine transport vessels in view of inspection requirements. The segmentable nature of the system permits spot inspection of the insulated surface by removing local panels only.

It is also within the scope of the invention to use it in combination with loose fill insulation, cast in-situ insulation or other precut insulation board systems. For example, various portions of a tank, or other surface such as a ship hold, may be covered with different systems as construction, heat transfer and economic considerations dictate. Also, it may be desirable to build onto the described insulating structure, such as with foamed-in-place polyurethane insulation.

The foregoing detailed description has been given for clearness of understanding only, and no unnecessary limitations should be understood therefrom, as modifications will be obvious to those skilled in the art.

What is claimed is:

1. An insulated surface comprising:
   a rigid surface having a plurality of studs projecting perpendicularly therefrom in spaced-apart rows;
   a first layer of abutting insulation boards placed against the surface, said insulation boards being spaced so that the studs are in abutting joints of the insulation boards;

wooden strakes positioned over the joints of abutting insulation boards of the first layer, said wooden strakes being secured to the studs;

a second layer of abutting insulation boards having abutting joints substantially parallel to, but offset from, the joints in the first layer of insulation and held in face-to-face contact with the first layer by fastener means secured to the wooded strakes; and a third layer of abutting insulation boards having abutting joints substantially parallel to, and in line with, the joints in the first layer and held in face-to-face contact with the second layer by fastener means secured to the wooden strakes in the first layer.

2. An insulated surface according to claim 1 in which the fasteners holding the insulation boards of the third layer in place are nails or screws extending from wooden strakes on the third layer to the wooden strakes on the first layer.

3. An insulated vertical surface comprising:

a rigid vertical surface having a plurality of studs projecting perpendicularly therefrom;

a first layer of abutting insulation boards placed against and in contact with the surface;

a plurality of wooden strakes positioned over and in contact with the abutting insulation boards of the first layer, said wooden strakes being secured to the studs;

a second layer of abutting insulation boards attached in face-to-face contact with the first layer;

a third layer of abutting insulation boards held in face-to-face contact with the second layer by means of fasteners secured to the wooden strakes; and convection stops in at least some of the vertical insulation board joints to provide a barrier to flow of vapor downwardly or upwardly.

4. An insulated surface comprising:

a rigid surface having a plurality of studs projecting perpendicularly therefrom;

a first layer of abutting insulation boards placed against and in contact with the surface;

a plurality of wooden strakes positioned over and in contact with the abutting insulation boards of the first layer, said wooden strakes being secured to the studs;

a second layer of abutting insulation boards attached in face-to-face contact with the first layer; and a third layer of abutting insulation boards held in face-to-face contact with the second layer by means of fasteners secured to the wooden strakes.

5. An insulated surface according to claim 4 in which the studs are located about at the joints of insulation boards in the first layer.

6. An insulated surface according to claim 4 in which the fasteners joining the insulation boards of the second layer to the wooden strakes are nails or screws.

7. An insulated surface according to claim 4 in which the fasteners holding the insulation boards of the third layer in place are nails or screws driven through the third and second layers into the wooden strakes.

8. An insulated surface according to claim 4 in which the third layer is covered by a metal sheet spray shield in contact with the third layer.

9. An insulated surface according to claim 4 in which the fasteners holding the insulation boards of the third layer in place are nails or screws extending from the wooden strakes on the third layer to the wooden strakes on the first layer.

10. An insulated surface according to claim 4 in which the second layer of insulation boards is attached to the first layer by means of fasteners secured to the wooden strakes.

* * * * *